UNITED STATES PATENT OFFICE.

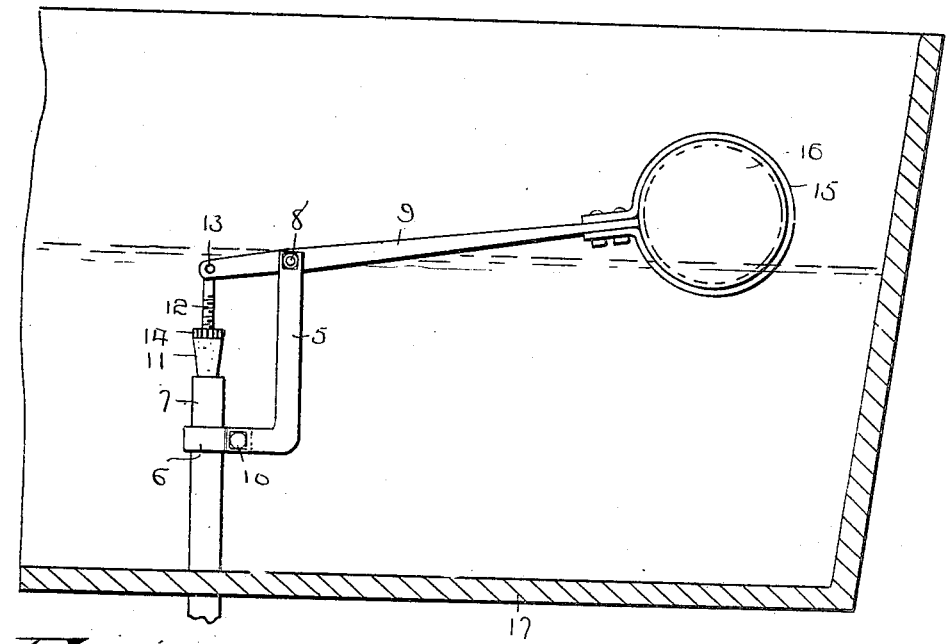
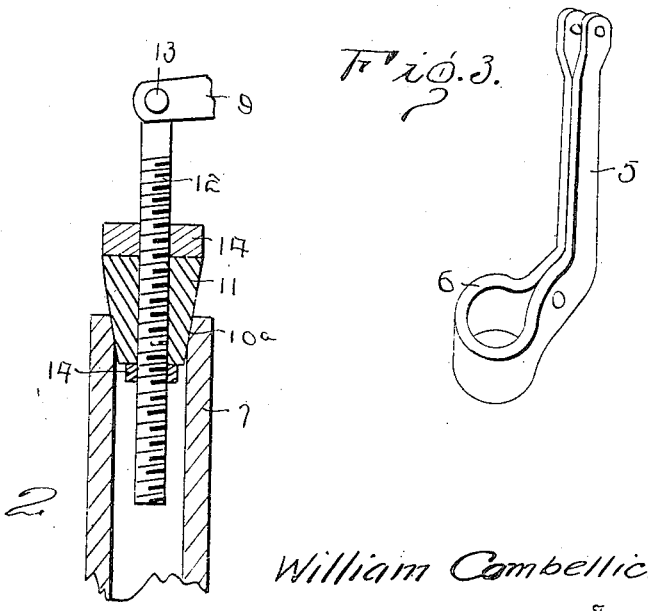

WILLIAM COMBELLICK, OF GETTYSBURG, SOUTH DAKOTA.

FLOAT-VALVE.

1,379,529.           Specification of Letters Patent.       Patented May 24, 1921.

Application filed June 21, 1919. Serial No. 305,820.

*To all whom it may concern:*

Be it known that I, WILLIAM COMBELLICK, a citizen of the United States, residing at Gettysburg, in the county of Potter and State of South Dakota, have invented certain new and useful Improvements in Float-Valves, of which the following is a specification.

This invention relates to that class of valves which are generally utilized to control the admission of liquid to a reservoir and the invention has for its object to provide a float valve embodying such features of novelty and simplicity as to afford economy of manufacture and convenience of application to use.

Another object is the provision of a valve of this character embodying features of adjustment for the valve and support for the float arm whereby desirable variations in the action of the valve are obtainable.

With these and other objects in view as will appear as the description proceeds the invention comprises the novel features of construction combination of elements and arrangements of parts which will be more fully described in the following specification as set forth with particularity in the claim appended hereto.

Figure 1 represents a fragmental sectional view through a tank or reservoir illustrating the invention applied to use, and, Fig. 2 represents an enlarged fragmentary vertical section through the upper portion of the supply pipe, illustrating the valve in detail.

Referring to the drawings, wherein similar reference numerals designate corresponding parts throughout the several views the numeral 5 indicates a bracket or attaching element preferably constructed of a single piece of strap metal having the medial portion folded to provide a pipe receiving loop 6 of such internal diameter as to accommodate the water supply pipe 7 to which it is to be applied. The material from which the bracket is constructed is preferably of a resilient character permitting contraction of the loop 6 facilitating the application of the bracket to pipes of varying diameters. The terminal portions of the bracket lying outwardly of the medial loop 6 are extended laterally of the pipe 7 and bent upwardly, the extreme ends being extended divergently and apertured to receive a bolt 8 forming a pivotal support for the float lever or arm 9. The contiguous portions of the bracket lying adjacent the loop 6 are also apertured to receive a bolt 10 having a nut fitted upon the terminal thereof permitting the bracket to be securely clamped in position upon the terminal portion of the supply pipe 7.

The discharge end of the pipe 7 is formed with an internal valve seat $10^a$ adapted to coact with a frusto-conical valve 11 so arranged that the tapered external surface thereof conforms to the internal contour of the seat $10^a$. The valve 11 is constructed of rubber or other pliable and yieldable material and is mounted for adjustment longitudinally of a screw threaded stem 12 pivotally secured at 13 to the terminal of the arm 9. The stem 12 extends a distance below the valve 11 and normally occupies a position within the upper terminal of the pipe 7, regardless of the position of the arm 9 whereby the movement of the valve 11, with relation to the seat $10^a$, is guided. The valve is held in adjusted position between superposed nuts 14 fitted upon the external screw threads of the stem 12 and the lower nut 14 provided with rounded corners so as not to engage the upper terminal of the pipe 7 and upon the closing movement of the valve. A split ring 15 is bolted or otherwise secured to the opposite terminal of the float arm 9 and receives a hollow cylindrical float 16 adapted to float upon the surface of the liquid contained in the reservoir 17 into which the pipe 7 is extended whereby the valve 11 is controlled by the quantity of water in the reservoir. By means of the bolt 10 the bracket 15 may be adjusted vertically upon the projecting terminal of the pipe 7 and held in adjusted position in order to vary the height of the liquid contained in the reservoir 17 and by proper adjustment of the valve 11 longitudinally of the stem 12 a similar result is obtainable.

What I claim is:

The combination with a fluid containing tank inlet pipe having a valve seat on its inner end; of a frusto-conical valve having a threaded bore extending longitudinally therethrough, a threaded stem extended through and adjustably mounted in said bore and projecting beyond the valve at one end a sufficient distance so as to be guided by the wall of the pipe and at its other end to form a connection, an arm pivoted at one end to said projecting stem and carrying a float at its other end and a bracket carried by said pipe with one end extended above said pipe in a plane spaced laterally from that occupied by the pipe and on which said arm is fulcrumed intermediate its ends.

In testimony whereof, I affix my signature hereto.

WILLIAM COMBELLICK.